Figure 1:
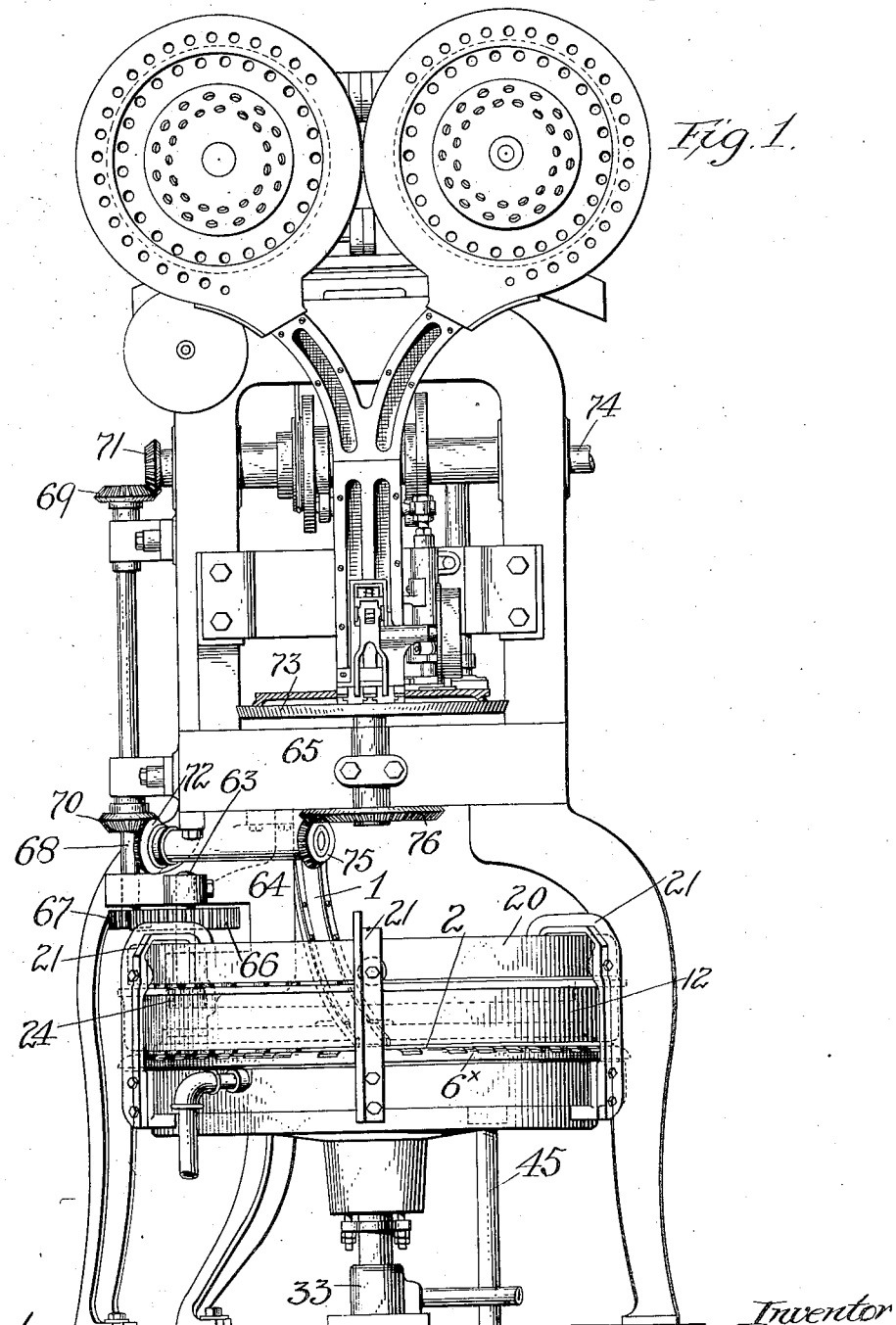

No. 887,883. PATENTED MAY 19, 1908.
W. H. WHEELER.
APPARATUS FOR THE MANUFACTURE OF BOTTLE CLOSURES.
APPLICATION FILED SEPT. 20, 1905. RENEWED OCT. 3, 1907.
4 SHEETS—SHEET 1.

Attest
V. E. Ourand
Edward N. Santon

Inventor
WILLIAM H. WHEELER
by Spear, Middleton, Donaldson & Spear
Attys.

No. 887,883. PATENTED MAY 19, 1908.
W. H. WHEELER.
APPARATUS FOR THE MANUFACTURE OF BOTTLE CLOSURES.
APPLICATION FILED SEPT. 20, 1905. RENEWED OCT. 3, 1907.

4 SHEETS—SHEET 2.

Attest
W. E. Ourand
Edward N. Laxton

Inventor
WILLIAM H. WHEELER
by Spear, Middleton, Donaldson & Spear
Attys.

No. 887,883. PATENTED MAY 19, 1908.
W. H. WHEELER.
APPARATUS FOR THE MANUFACTURE OF BOTTLE CLOSURES.
APPLICATION FILED SEPT. 20, 1905. RENEWED OCT. 3, 1907.
4 SHEETS—SHEET 4.
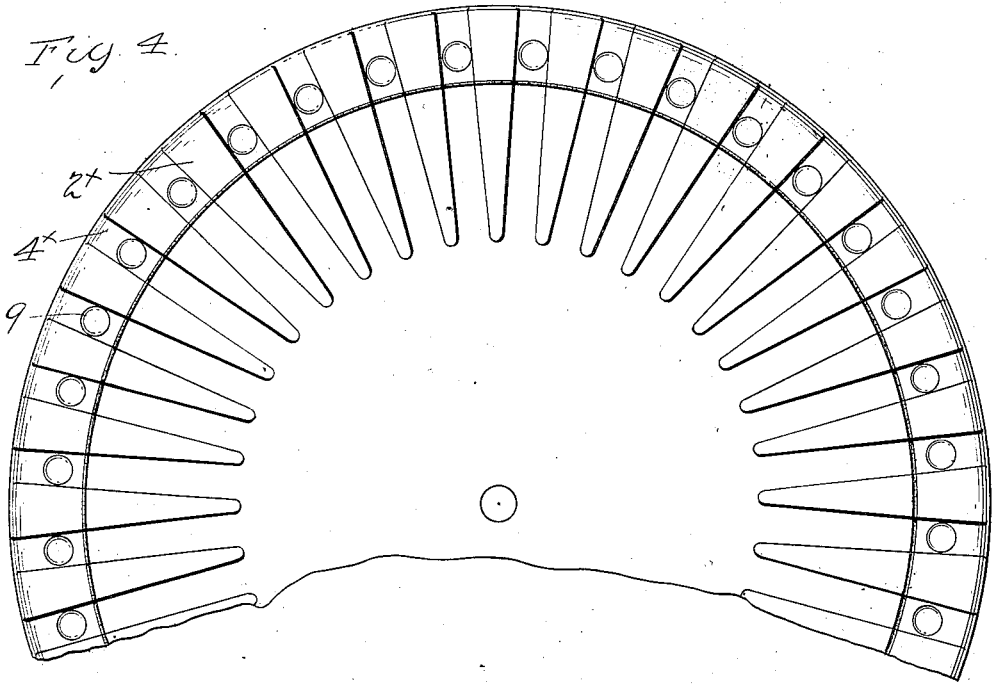
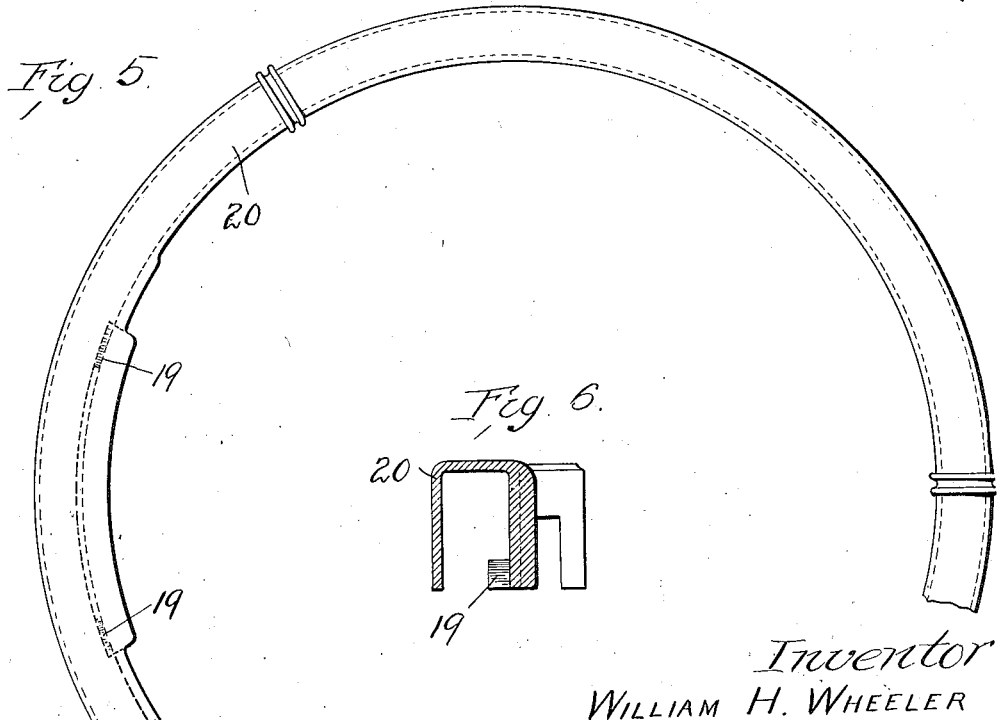
Inventor
WILLIAM H. WHEELER

UNITED STATES PATENT OFFICE.

WILLIAM H. WHEELER, OF BALTIMORE, MARYLAND, ASSIGNOR TO THE CROWN CORK AND SEAL CO., OF BALTIMORE, MARYLAND, A CORPORATION.

APPARATUS FOR THE MANUFACTURE OF BOTTLE-CLOSURES.

No. 887,883.      Specification of Letters Patent.      Patented May 19, 1908.

Application filed September 20, 1905, Serial No. 279,349. Renewed October 3, 1907. Serial No. 395,760.

*To all whom it may concern:*

Be it known that I, WILLIAM H. WHEELER, a citizen of the United States, residing at No. 1511 Guilford avenue, Baltimore, Maryland, have invented certain new and useful Improvements in Apparatus for the Manufacture of Bottle-Closures, of which the following is a specification.

My invention relates to the manufacture of bottle closures of the class known as crown cork sealing caps or closures, and it concerns particularly a machine for uniting the compressible or resilient packing material to the metallic cap.

In carrying out my invention I employ heat to soften or fuse the protecting and binding medium located between the packing or sealing gasket and the metal cap and after the parts are thoroughly heated they are allowed to cool or subjected to artificial cooling, and during this time they are subjected to pressure so as to firmly unite the packing or gasket to the cap by the binding and protecting medium. During the heating action of the parts they are not subjected to pressure or to any action which would tend to confine any moisture or air which may be in the material or in the pit holes or crevices thereof or pocketed between the members of the closure, but on the contrary, the assembled parts are left entirely free for the escape of any moisture or for the escape of the air in expanding. The advantages of this mode of procedure and the means for carrying out the same will be set forth hereinafter.

I aim among other things to provide a construction for the uniting of the assembled members of the closure which may be added to existing forms of assembling machines, occupying no more floor space than is necessary to accommodate the existing form of machine. I have sought also to provide a compact arrangement, but at the same time one in which the heating action on the members of any one closure may be continued a sufficiently long time to thoroughly soften the binding material and to drive out any moisture or air in the material or between the members which might interfere with the firm uniting of the parts.

The invention consists in the features, combination and arrangement of parts hereinafter described and particularly pointed out in the claims.

Figure 2:
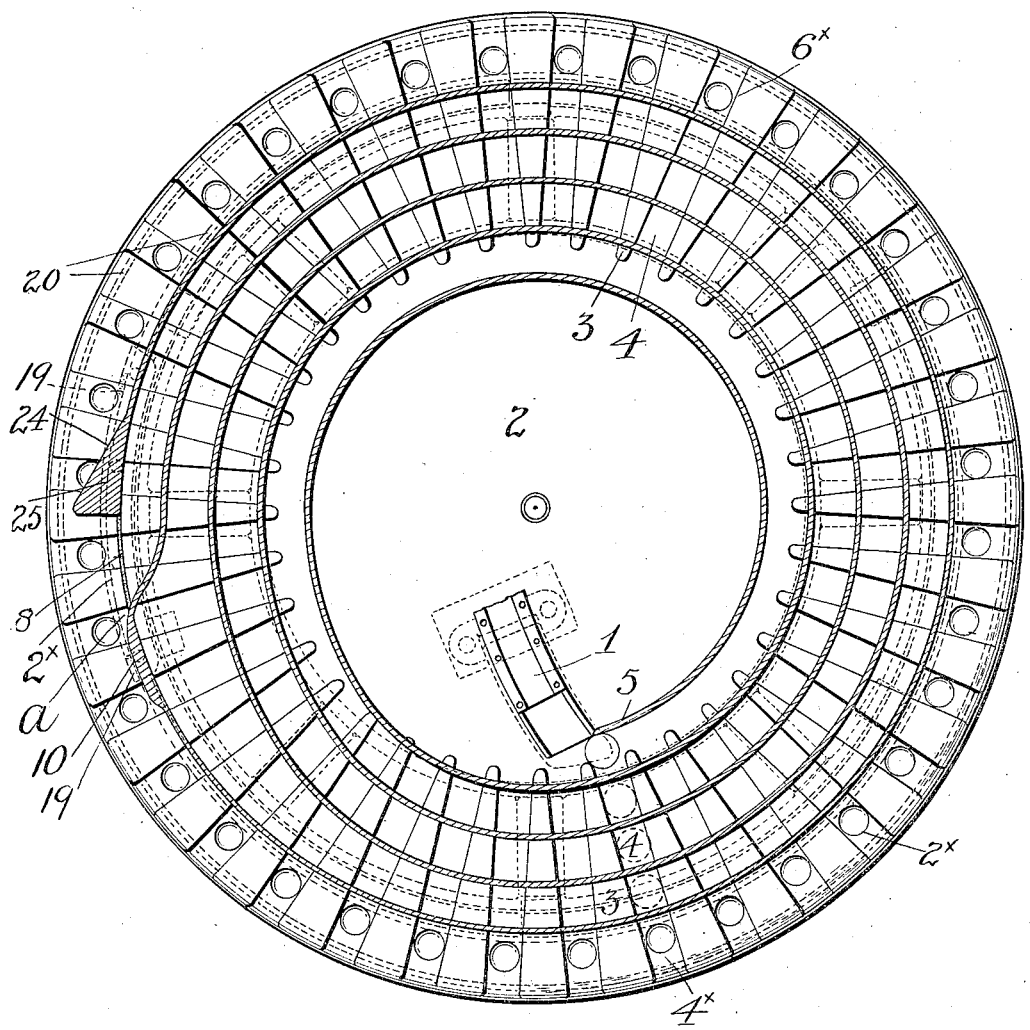
Figure 3:
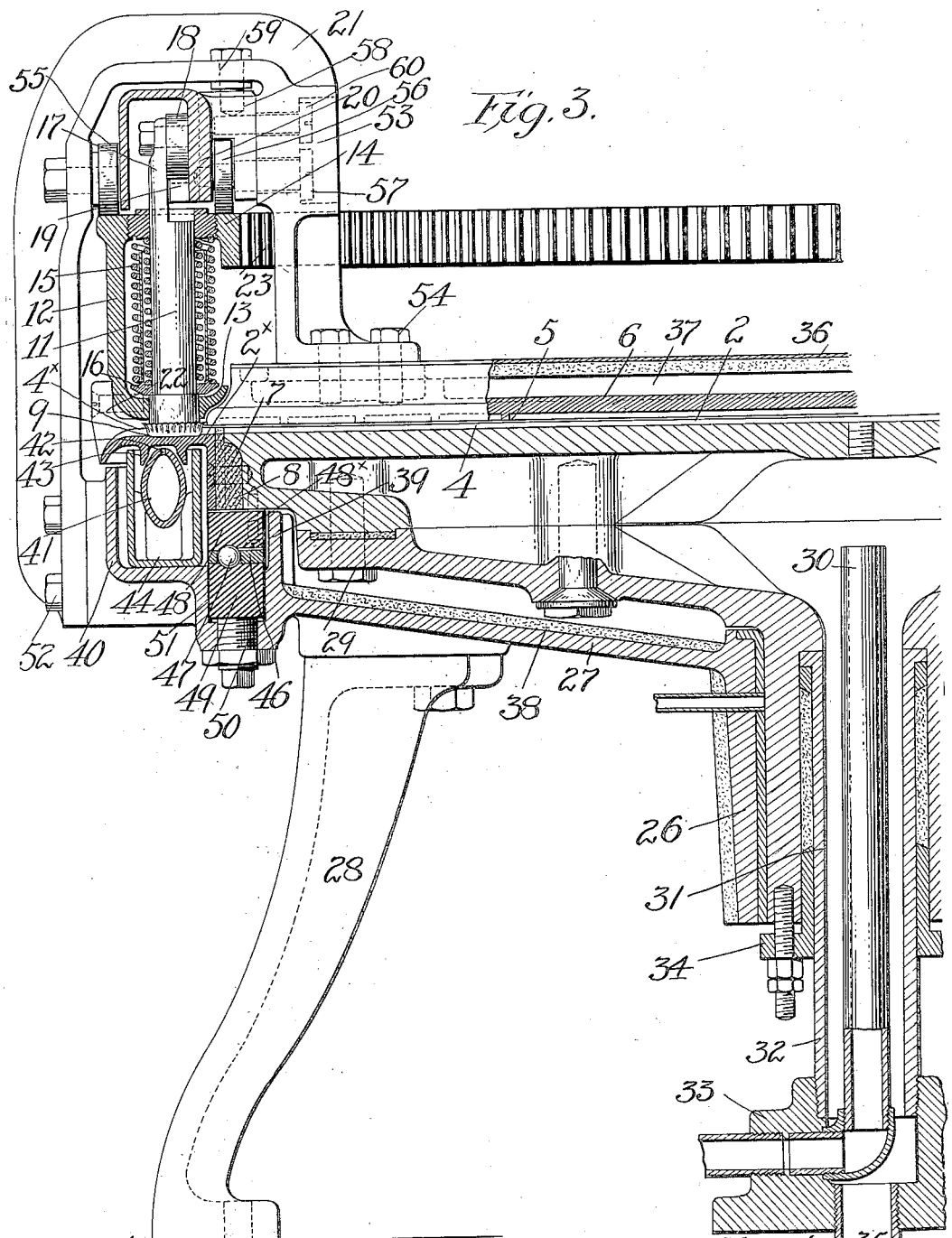

In the accompanying drawings,—Figure 1 is a front view of a machine embodying my invention. Fig. 2 is a plan view of the heating table or steam plate showing also in section the spiral arranged above the plate for controlling the movement of the closures thereover and further, showing the chill ring surrounding the heating plate or steam table upon which the closures, together with their contents, are subjected to compression while being cooled. Fig. 3 is a sectional view through the heating table or steam plate together with the chill ring and compressing device with the parts associated with the elements named. Fig. 4 is a plan view of a portion of the heating plate and table with part of the chill ring also shown. Fig. 5 is a plan view of the housing for the plungers with the cam carried thereby illustrated in dotted lines. Fig. 6 is a sectional detail view of the housing.

The invention is shown in connection with the type of apparatus for making composite closures such as is disclosed in Letters Patent of the United States, granted to me August 29, 1905, #798549. In said apparatus the metallic caps, the collets of paraffin paper and the cork disks are assembled and are subjected to the action of suitable die mechanism which presses the component parts intimately together, compressing the sealing disk and mechanically uniting the parts by slightly contracting the vertical wall of the metallic cap or crown or by slightly reducing the diameter of the crown so as to cause it to grip and hold the cork or sealing disk in place therein. In the machine described in the said patent, after the parts have been assembled and united mechanically, as just described, they are discharged from the apparatus, but my present improvement contemplates uniting the metallic cap with its compressible contents or packing by fusing the interposed material, such for instance as the collet described, and subjecting the parts to pressure while cooling and while the binding or sealing material is hardening.

It is thought to be unnecessary to describe the assembling mechanism and the die mechanism as these parts are fully disclosed in the patent referred to. After leaving the die mechanism the composite closure is discharged into a chute 1, Fig. 1, which directs the closure onto a heating table or steam plate 2. The cap as discharged upon this table is in inverted position resting with what is actually its top side on the table.

The heating table or steam plate is rotated, as will be hereinafter described, and it is provided with a series of ribs 3 of wedge shape, that is, increasing in width outwardly so as to provide a series of channels or grooves 4, between them which grooves are of equal width throughout their extent and are adapted to receive the closures or caps in inverted position to direct them to the outer edge of the table.

The closures as they are discharged from the end of the chute 1 enter between the ribs 3 and in position to be acted on by the downwardly projecting walls or ribs 5 of a plate 6, which is supported in fixed position as will be hereinafter described.

The walls 5 extend spirally and by acting upon the upturned flanges of the closure as the same is carried around by the movement of the heating plate, they cause the closures to move radially outward through the grooves or channels 4. During this outward movement the closures are subjected to heat from the heating table which being transmitted through the metal of the cap, directly in contact with the heating table, causes the binding and protecting material which is interposed between the compressible packing of cork or other material and the cap to be fused for the purpose of uniting the compressible packing with the cap and for other purposes as fully set forth in the Letters Patent of the United States #792284, granted June 13, 1905, to William Painter.

Surrounding the steam plate or heating table and moving therewith is arranged a chill ring 2$^x$, which is ribbed and grooved to form continuations of the ribs and grooves of the steam or heating table, the said chill ring being secured to the heating table by screws 7, Fig. 3, with asbestos packing 8 interposed to prevent the transmission of heat to the chill ring. This ring is subjected to cooling influences, as will be hereinafter described, and it is provided with a series of depressions 9, one in each of the grooves 4$^x$ which form continuations of the groove 4 of the heating table. These depressions are adapted to receive the closures and form a centering recess for the same to aid in holding the closure in place during the cooling of the parts and while they are subjected to pressure.

It will be seen that the closures as they traverse the heating table are free, not being subjected to pressure, and they follow each other through the grooves 4 closely, and during this time they are subjected to the heat from the heating table for which the spiral plate acts as a cover and serves to form, in connection with the surface of the heating table, a chamber in which the closures are subjected to the heat while free from pressure.

The spiral of the plate 6 continues to act on the closures until they are discharged at the point $a$ Fig. 2 onto the chill ring, the spiral at this point having an abrupt outward bend in its walls and the depending wall having also a concentric portion 10, just beyond the point $a$, which by acting on the closure will move it into the depression 9. As soon as this takes place, and of course as soon as the metal cap of the closure contacts with the chill ring, the parts of the closure are subjected to the cooling action of the said chill ring, and while cooling is subjected to pressure. The pressure is exerted through a plunger, one for each of the depressions in the chill ring, said plungers 11 being guided in a casting of ring shape 12, having an inturned lower flange 13, and an inturned upper flange 14 through which flanges the plunger 11 is guided.

Each plunger is pressed normally downwardly by a spring 15 bearing upon the ring casting at the upper end and upon a collar 16 on the plunger at the lower end. Each plunger has an extension 17, carrying a roller 18, which is adapted to coöperate with a cam 19 which is supported on a casting or ring 20, which is supported on brackets 21, which brackets are supfixed to brackets 21, which brackets are supported from a stationary portion of the machine as will be hereinafter described.

The plunger carrying ring rotates with the steaming or heating table and the chill ring, being connected to the said ring by screws 22. The said plunger carrying ring or casting has a circular row of teeth 23 on its inner side meshing with a gear wheel 24 which is driven as will be hereinafter set forth.

The stationary cam 19 for controlling the vertical position of the plungers and their action on the closure extends only a short way about the circular casting 20 to which it is attached, and in the revolution of the steaming table, chill ring and plunger-carrying-ring the plungers are raised just before they reach the point at which the closures are discharged from the spiral and from the heating table onto the chill ring, and this permits the proper positioning of the closure beneath the elevated plunger, and when this has taken place the roller of the elevated plunger runs off from the stationary cam 19, thus allowing the plunger to fall and engage the packing, placing the same together with the other parts of the closure under compression, and in this condition, and while in contact with the chill ring, the closure makes very nearly a full revolution, about the axis of the machine until the roller on the plunger again arrives at the stationary cam 19 when the said plunger is again lifted and the closure with its parts united by the fusible material which has now been cooled and hardened, is discharged from the chill ring by coming in contact with the outwardly inclined edge 24 of the wing 25 forming a termination of the outer wall of the spiral, this wing with its inclined edge being located close to the point at which the closure is thrust upon the chill ring from the spiral so that nearly a complete revolution of the machine takes place during the time the closure is subjected to the cooling influences of the chill ring and to the pressure acting directly upon the compressible packing so that an effective hardening of the fusible substance will take place before the packing is released from its compressed condition, this being important in order to prevent the packing in resuming its uncompressed condition, from destroying the binding effect of the interposed fusible material.

Having described the general features and operation of the invention, certain details of construction and arrangement will be necessary to be disclosed in order to fully understand the same.

As will be seen from Fig. 1, the heating, cooling and pressure mechanism is arranged beneath the assembling and die mechanism of the machine above referred to and axially in relation thereto occupying no more floor space than is necessary for the said machine.

The heating table turns in a central bearing 26 of a frame or plate 27 which is supported by legs 28 from the floor. The heating table is formed in two parts joined by screws at 29 with interposed packing, the two parts forming a chamber into which steam is admitted by a pipe 30. The exhaust takes place through the hub 31 of the steam table and a pipe 32 extending into the said hub about the steam inlet pipe 30 from a casting 33 suitably supported on the floor and through which also the steam pipe enters. From this casting a discharge opening 35 directs the exhaust steam to any suitable point. A stuffing box is provided at 34 of any suitable construction.

The plate carrying the spiral and constituting a part of the heating chamber for the closures is provided with a covering of asbestos, as at 36, forming between itself and the plate an air space 37. This construction prevents the radiation of heat and asbestos may be applied at all necessary points to confine the heat to the heating chamber. It is also shown at 38 as a lining for the stationary frame or plate 27. This plate or frame has formed therewith an annular channeled portion made up of the inner and outer flanges 39, 40. In this channel is placed means for cooling the chill ring consisting of a pipe 41 for conveying the cooling fluid, such as water or compressed air, the said pipe having jet openings 42 to direct the fluid to the underside of the chill ring at or near the center, on each side of which the chill ring is provided with depending flanges 43 to better control the cooling fluid and cause it to act more thoroughly upon the chill ring. The cooling pipe is carried in a trough 44 held within the annular channel of the plate or frame 27, the said trough receiving the fluid after acting upon the chill ring and conveying it to a suitable discharge, as for instance, the outlet pipe 45, Fig. 1. The annular channel has also located therein a ball bearing arrangement for the steam table. This consists of a ring 46 having a series of openings for anti-friction balls 47, which balls are borne upon by a ring 48 attached by screws $48^\times$ to the steam table and said balls rest upon a ring 49 having a raceway therein for the balls, which ring is held adjustably by a screw 50 in a groove 51 of the plate or frame 27.

As before stated, the ring or casting for supporting the cam 19 and which also serves to house the rollers and plungers, is supported upon the brackets 21, and these brackets are secured by screws 52 to the outer side of the stationary plate or frame 27. These brackets 21 also have extensions 53 reaching down within the housing or ring 20, and by means of bolts 54 they support the spiral plate, before mentioned, in a stationary manner.

The housing 20 carrying the cam 19 for operating the plungers 11 is attached to the brackets 21 by the screws 59, 60. Anti-friction bearings are provided at the upper part of the rotating ring or casting 12 consisting of the anti-friction rollers 55 and 56, the latter of which turns on a part of the screw 57.

The connections for driving the heating table comprise besides the circular rack 23 and gear 24, the shaft 63, upon which said gear 24 is fixed, said shaft having its bearings in a bracket 64 secured to the main frame 65 of the table, the gear 66 on said shaft meshing with a pinion 67 on the shaft 68, which forms a part of the transmitting connection of the assembling machine, carrying thereon the bevel gears 69 and 70 meshing respectively with the bevel gears 71, 72, whereby the feed plate 73 of the assembling machine is driven from the main shaft 74 through the gearing 75, 76.

From the above it will be seen that the assembled parts of the closure are subjected to heat while in the condition in which they leave the dies of the assembling machine. In this condition the packing while frictionally held by the walls of the cap, is free from pressure or from contact with any device which might act to prevent the escape of the air or moisture from the crevices or from the body of the material itself within the cap. It is desirable to allow the air and moisture, if there be any, to escape freely before the parts are subjected to pressure, for if the pressure takes place before or simultaneously with the heating, any air contained in the pit holes or crevices of the packing or between the members of the closure or any moisture present on or about the members, may, by expanding, tend to separate the parts and prevent them from uniting perfectly under continued pressure. Further, it will be observed that as a heating medium, I use steam and this is applied to the table over whose imperforate surface the crowns pass. There is thus no direct contact of the heating medium with the crowns and no damage results thereto. During the application of the pressure the cap rests firmly upon the chill ring and the plunger engages the packing without requiring or causing any change in the shape of the flange of the cap, said plunger being free to rise from the cap at any time.

The heating table occupies the space within the standards or supporting legs of the apparatus and by reason of the spiral course over which the closures are made to pass, the heat continues to act on the closures for a long time so as to thoroughly soften the interposed binding material and prepare the parts for the cooling and pressing action.

It will be understood that the fundamental principle underlying the organization of elements above described may be embodied in apparatus of different form from that disclosed herein without departing from the broad scope of my invention.

The rotary table serves both as a heating means and also as a means for imparting movement to the closures, which movement is controlled by the spiral so that they traverse the table radially outward.

The assembling mechanism may be the same as that disclosed in the patent above referred to or any other desired form may be employed.

I do not limit myself to the precise form of the elements herein described.

I claim:—

1. In an organization for uniting the metallic member of a bottle or like closure with its compressible packing having a fusible material interposed between it and said metallic member, means for heating the assembled members of the closures while free to allow the expanding air to escape, and means for pressing the parts together while cooling, substantially as described.

2. In an organization for uniting the metallic member of a bottle or like closure with its compressible packing having a fusible material interposed between it and said metallic member, means for heating the assembled members of the closures while free to allow the expanding air to escape, means for cooling the parts, and means for pressing the parts together while cooling, substantially as described.

3. In an organization for uniting the metallic member of a bottle or like closure with its compressible packing having a fusible material interposed between it and said metallic member, means for heating the assembled members of the closures while free from pressure to allow the expanding air to escape, and means for pressing the parts together while cooling, substantially as described.

4. In an organization for uniting the metallic member of a bottle or like closure with its compressible packing having a fusible material interposed between it and said metallic member, a plunger, a support on which the closure rests and between which and the plunger the closure is pressed, and means for heating the assembled parts of the closure for fusing the interposed material before the compression takes place said compression taking place during the cooling of the parts and the hardening of the interposed binding material, substantially as described.

5. In an organization for uniting the metallic member of a bottle or like closure with its compressible packing having a fusible material interposed between it and said metallic member, means for supporting the closure in inverted position, means engaging the packing and the cap or metallic member to press them towards each other, and means for applying heat to fuse the said interposed binding material before the inverted closure is subjected to pressure and while it is free to allow the escape of the expanding air, substantially as described.

6. In an organization for uniting the metallic member of a bottle or like closure with its compressible packing having a fusible material interposed between it and said metallic member, means for supporting the closure in inverted position, means engaging the packing and the cap or metallic member to press them towards each other, means for cooling the closure while subjected to pressure, and means for applying heat to fuse the said interposed binding material before the inverted closure is subjected to pressure and while it is free to allow the escape of the expanding air, substantially as described.

7. In an organization of the class described, means for pressing the parts of the closures together and means for heating the closures with their interposed fusible binding material, said heating means serving to move the closures to the pressing means, substantially as described.

8. In combination in apparatus of the character described, means for heating the closures with their interposed binding material comprising a table, means for moving the closures outwardly over the said table while being heated, and means for receiving the outwardly moving closures and subjecting them to pressure to unite the parts, substantially as described.

9. In combination in apparatus of the character described, means for heating the closures with their interposed binding material comprising a table, means for moving the closures radially outwardly over the said table while being heated, and means for receiving the outwardly moving closures and subjecting them to pressure to unite the parts, substantially as described.

10. In combination in apparatus of the character described, means for heating the closures with their interposed binding material comprising a table, means for rotating said table, means for effecting the movement of the closures outwardly over the said table while being heated, and means for receiving the outwardly moving closures and subjecting them to pressure to unite the parts, substantially as described.

11. In combination, in apparatus of the character described, a table for supporting the closures, a guiding device over the table, one of said parts being movable to cause an outward movement of the closures in respect to the table, means for applying heat and means for receiving the closures when moved outward adapted to press the parts of the closure together, substantially as described.

12. In combination in an apparatus of the class described, a rotary table for supporting the closures, means over the said table for effecting in connection with the movement of the said table an outward passage of the closures over the table, means for applying heat, and means at the outer edge of the table for receiving and pressing the parts of the closures together, substantially as described.

13. In combination in an apparatus of the class described, a rotary table for supporting the closures, means over the said table for effecting in connection with the movement of the said table an outward passage of the closures over the table, means for applying heat and means adjacent the outer edge of the table for receiving and pressing the parts of the closures together, said pressing means revolving in unison with the table, substantially as described.

14. In combination in an apparatus of the class described, a rotary table for supporting the closures, means over the said table for effecting in connection with the movement of the said table an outward passage of the closures over the table, means for applying heat and means adjacent the outer edge of the table for receiving and pressing the parts of the closures together, said pressing means revolving in unison with the table and consisting of a circular series of plungers, substantially as described.

15. In apparatus of the class described, means for pressing the parts of the closures together, an imperforate table on which the closures rest, and means for applying heat to the said table, said pressing means being adapted to receive the closures from the said plate, substantially as described.

16. In apparatus of the class described, means for pressing the parts of the closures together, an imperforate table upon which the closures rest, means for applying heat to said table, and means for causing the closures to move over the said table outwardly to the pressing means, substantially as described.

17. In combination, in apparatus of the class described, means for pressing the parts of the closure together, a table having outwardly extending ways to direct the closures to the pressing means, means for causing the closures to pass outwardly through said ways, and means for applying heat, substantially as described.

18. In combination in apparatus of the class described, means for pressing the parts of the closure together, a table upon which the closures rest in inverted position, means for applying heat and a plate over the table forming between itself and the table a heating chamber, said pressing means receiving the closures from the table, substantially as described.

19. In combination in apparatus of the class described, means for pressing the parts of the closure together, a table upon which the closures rest in inverted position, means for applying heat and a plate over the table forming between itself and the table a heating chamber, and a spiral guide depending from said plate to engage the closures, said pressing means receiving the closures from the table, substantially as described.

20. In combination in apparatus of the class described, means for pressing the parts of the closures together, an imperforate table upon which the closures rest, a steam chamber beneath the said table for heating the same, said pressing means receiving the closures from said table, substantially as described.

21. In combination in apparatus of the class described, a rotary table having outwardly extending grooves or ways, a guide for causing the movement of the closures outwardly, and a series of plungers revolving in unison with the rotary table and receiving the closures from the rotary table, substantially as described.

22. In combination in apparatus of the class described, a series of plungers, means for previously heating and then delivering the closures thereto, and means for positively discharging the closures from in front of the plungers, substantially as described.

23. In apparatus of the class described, a revolving series of plungers, means for previously heating and then delivering the closures thereto and means for discharging the closures from beneath the plungers at one point, substantially as described.

24. In apparatus of the class described, a revolving series of plungers, means for previously heating and then delivering the closures thereto and means for discharging the closures from beneath the plungers at one point, said means consisting of the incline in the path of movement of the closures, substantially as described.

25. In combination in apparatus of the class described, means for heating the closures while free from pressure, chilling and pressing means, and means whereby the closures are delivered from the heating means to the chilling and pressing means, substantially as described.

26. In combination in apparatus of the class described, means for heating the closures while free from pressure, chilling and pressing means for receiving the heated closures from the heating means, said pressing means acting to press the parts of the closure together between itself and the chilling means, substantially as described.

27. In combination in apparatus of the class described, means for heating the closures while free from pressure, a chill plate and plunger for receiving the heated closures for cooling and uniting the parts thereof, said plunger pressing the closures between itself and the chill plate, substantially as described.

28. In combination in apparatus of the class described, a table, means for applying heat, a chill ring surrounding the table to receive the heated closures therefrom and means for pressing the closures to unite the parts thereof while cooling on the chill ring, substantially as described.

29. In combination, in apparatus of the class described, a plate having outwardly extending ways or grooves, a chill ring surrounding the plate and having ways forming continuations of those of the heating plate, and plungers for pressing the closures while on the chill ring to unite the parts while cooling and during the hardening of the binding material, substantially as described.

30. In combination in apparatus of the class described, a rotary table, means for applying heat, means for causing the closures to move over the surface of said table outwardly, a chill ring surrounding and revolving with the said table and receiving the heated closures therefrom, and means for pressing the closures to unite the parts thereof while cooling upon the chill ring, substantially as described.

31. In combination in apparatus of the class described, a rotary table, a concentric chill ring, said table and ring having their surfaces in the same plane, means for delivering the closures from the table onto the chill ring, and means for pressing the closures on said chill ring, substantially as described.

32. In combination in apparatus of the class described, a rotary table, a concentric chill ring, means below the table and ring for heating and chilling the same respectively, means whereby the closures are delivered from the heated table to the chill ring and means for pressing the closures while on the chill ring to unite the parts thereof, substantially as described.

33. In combination in apparatus of the class described, means for heating the closures while free from pressure, a chill support having a depression to receive the closures, means for moving the closures into said depressions, and means for pressing the closures while in said depressions, substantially as described.

34. In combination in apparatus of the class described, a heating table, a chill ring surrounding the same, a series of plungers over the chill ring, means over the table for moving the closures outwardly onto the chill ring and for centering the same beneath the plungers, substantially as described.

35. In combination in apparatus of the class described, a heating table, a chill ring surrounding the same, a series of plungers over the chill ring, means over the table for moving the closures outwardly onto the chill ring and for centering the same beneath the plungers, said heating table, chill ring and series of plungers having revolving movement and means at one point for discharging the closure from the chill ring after being pressed to unite the parts of said closure, substantially as described.

36. In combination in apparatus of the class described, a rotary heating table, a chill ring surrounding the same and rotating therewith, a series of plungers rotating with the chill ring, means for delivering the closures from the heating table onto the chill ring, means for discharging the closures after being pressed to unite their parts, said discharge taking place at a point adjacent the delivery point of the closures onto the chill ring, means for lifting the plungers at the discharge point, and means for lowering them at the delivery point and holding them lowered during the greater portion of the revolution of the parts, substantially as described.

37. In combination with the assembling machine, apparatus for uniting the parts of the closures and means for directing the closures from the assembling machine to the said uniting apparatus, said assembling machine being superimposed in relation to the uniting apparatus, substantially as described.

38. In combination in apparatus of the class described, the table for supporting the closures, heating means, a spiral guide over said table and means for receiving the closures from the said table to press them and unite the parts, substantially as described.

In testimony whereof, I affix my signature in presence of two witnesses.

WILLIAM H. WHEELER.

Witnesses:
   HOWARD D. ADAMS,
   JOHN BLACK.